(12) United States Patent  
Biehe et al.

(10) Patent No.: US 11,576,386 B2  
(45) Date of Patent: Feb. 14, 2023

(54) ROTARY DOUGH MOLDING MACHINE

(71) Applicant: HAAS FOOD EQUIPMENT GMBH, Leobendorf (AT)

(72) Inventors: Snorre Krogh Biehe, Roskilde (DK); Hans Henrik Jochumsen, Allerød (DK); Tomas Eg Kjersgaard, Kopenhagen (DK); Stefan Jiraschek, Königsbrunn (AT)

(*) Notice: Subject to any disclaimer, the term of this patent is extended or adjusted under 35 U.S.C. 154(b) by 292 days.

(21) Appl. No.: 16/332,862

(22) PCT Filed: Sep. 14, 2017

(86) PCT No.: PCT/AT2017/060228  
§ 371 (c)(1),  
(2) Date: Mar. 13, 2019

(87) PCT Pub. No.: WO2018/049453  
PCT Pub. Date: Mar. 22, 2018

(65) Prior Publication Data  
US 2019/0357548 A1    Nov. 28, 2019

(30) Foreign Application Priority Data

Sep. 16, 2016 (DE) .......................... 102016011120.8

(51) Int. Cl.  
*A21C 11/10* (2006.01)  
*A21C 9/08* (2006.01)  
(Continued)

(52) U.S. Cl.  
CPC ................ *A21C 9/08* (2013.01); *A21C 5/003* (2013.01); *A21C 11/08* (2013.01); *A21C 11/10* (2013.01);  
(Continued)

(58) Field of Classification Search  
CPC .......... A21C 5/003; A21C 11/08; A21C 11/10  
See application file for complete search history.

(56) References Cited

U.S. PATENT DOCUMENTS 2,130,887 A    9/1938  Kremmling  
3,949,660 A *  4/1976  Kuhlman ................. A21B 5/00  
                                                                                99/352  
(Continued)

FOREIGN PATENT DOCUMENTS

CN          2130350 Y     4/1993  
CN          202286052 U   7/2012  
(Continued)

OTHER PUBLICATIONS

CN 202286052 translation (Year: 2012).*  
(Continued)

*Primary Examiner* — Timothy Kennedy  
*Assistant Examiner* — Alexander A Wang  
(74) *Attorney, Agent, or Firm* — Gordon & Jacobson, P.C.

(57) ABSTRACT

A rotary dough molding machine (10). The machine has a frame (6), a die roller (4) rotatably mounted to the frame (6), a knife (3) for scraping dough from the die roller (4), the knife (3) extending along the die roller (4), and a driver for moving the knife (3) between a scraping position and an inactive position, with the driver having a first drive (1) acting on the first end (31) of the knife (3) and a second drive (2) acting on the second end (32) of the knife (3). The first drive (1) and the second drive (2) can be actuated independently of each other.

15 Claims, 4 Drawing Sheets

(51) Int. Cl.
  *A21C 11/08* (2006.01)
  *A21C 5/00* (2006.01)
  *B29C 67/00* (2017.01)
  *B26D 1/60* (2006.01)
  *B26D 5/02* (2006.01)

(52) U.S. Cl.
  CPC ............... *B26D 1/60* (2013.01); *B26D 5/02* (2013.01); *B29C 67/0003* (2013.01); *B29C 2793/0027* (2013.01)

(56) References Cited

U.S. PATENT DOCUMENTS

| | | | | |
|---|---|---|---|---|
| 4,026,210 | A | * | 5/1977 | Merzagora ............... B41F 31/02 101/350.5 |
| 4,269,140 | A | * | 5/1981 | Burns .................... D06B 15/02 100/47 |
| 4,586,888 | A | | 5/1986 | Anderson |
| 5,683,734 | A | | 11/1997 | Israel |
| 2013/0152749 | A1 | | 6/2013 | Salador et al. |

FOREIGN PATENT DOCUMENTS

| CN | 203943002 U | 11/2014 |
|---|---|---|
| CN | 205455655 U | 8/2016 |
| CN | 105922316 A | 9/2016 |

OTHER PUBLICATIONS

Nylon Washers. http://web.archive.org/web/20150310183447/https://www.phoenixspecialty.com/products/washers/nylon-washers (Year: 2015).*
International Search Report and Written Opinion of International Application No. PCT/AT2017/060228 dated Dec. 4, 2017.
Brazilian Office Action dated Dec. 2, 2021 of Application No. BR112019004031-5.

* cited by examiner

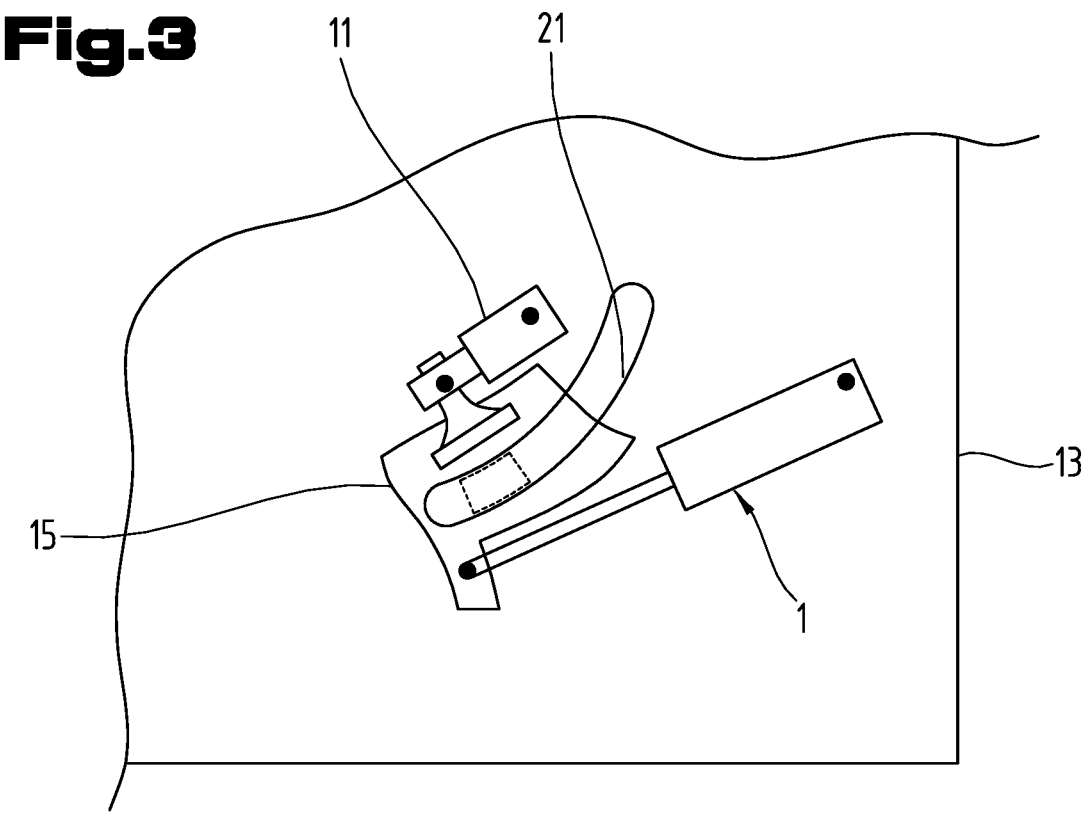
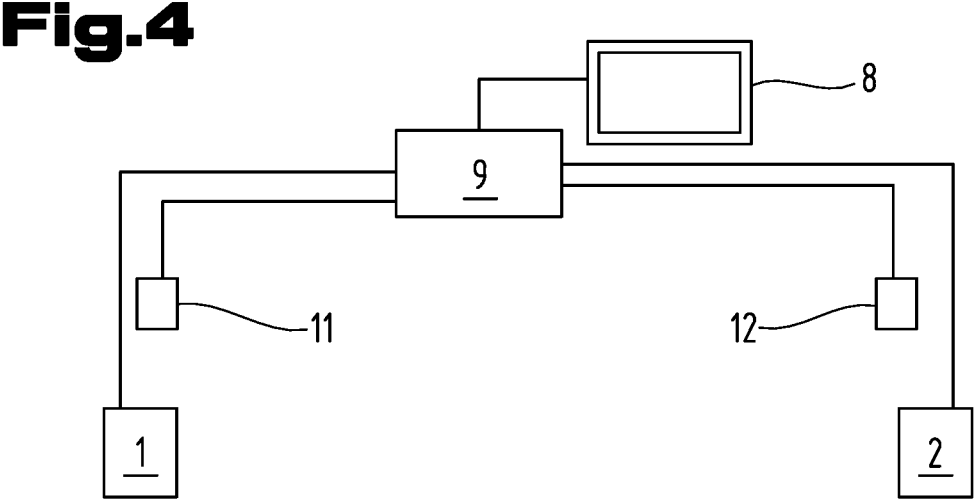

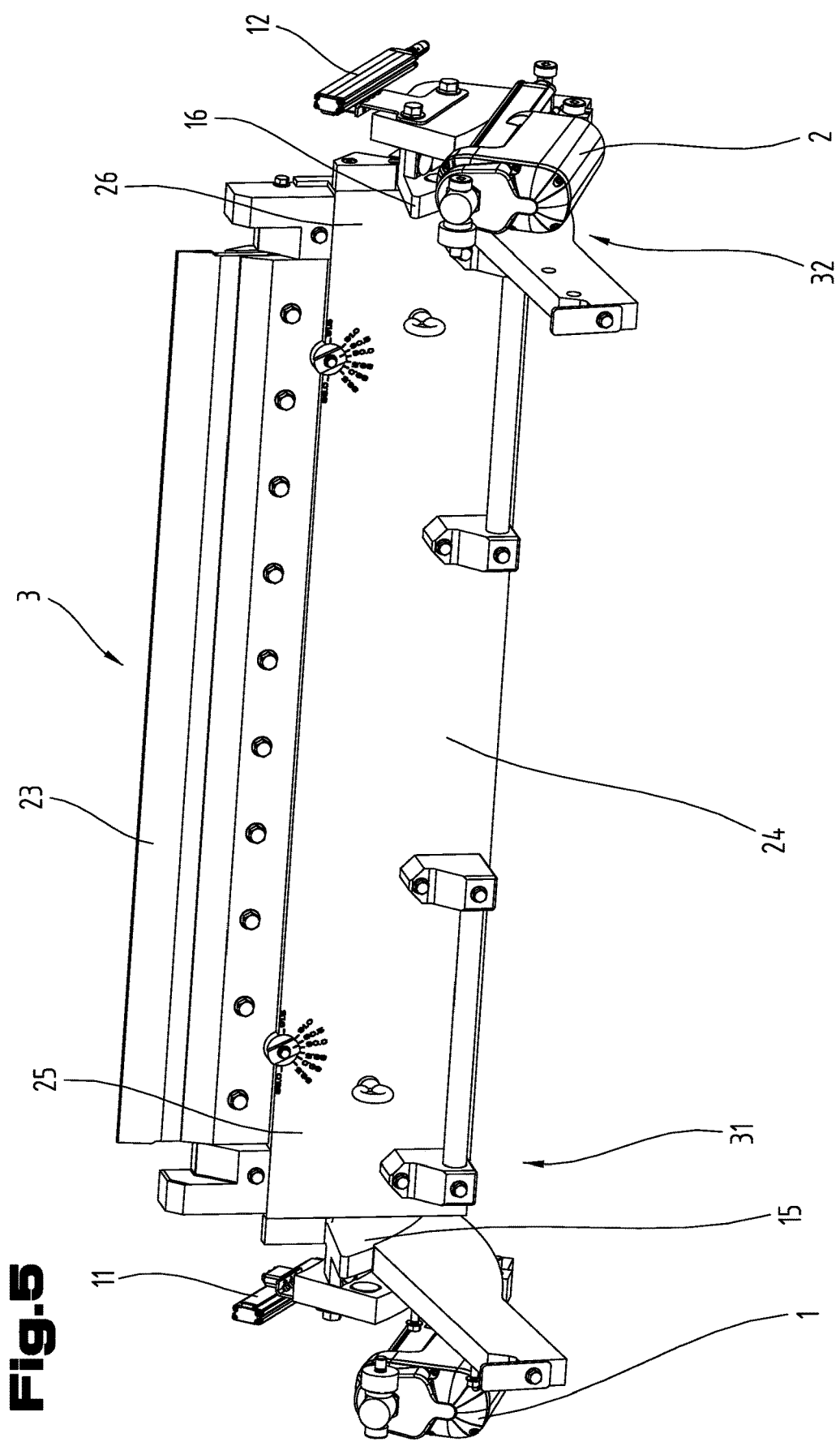

ROTARY DOUGH MOLDING MACHINE

CROSS-REFERENCE TO RELATED APPLICATION(S)

This application is the National Stage of International Patent Application No. PCT/AT2017/060228 filed on Sep. 14, 2017, which claims priority from German Patent Application No. DE 102016011120.8 filed on Sep. 16, 2016, both of which are hereby incorporated by reference herein in their entireties.

BACKGROUND

1. Field of the Invention

The invention relates to a rotary dough molding machine. In addition, the invention relates to a method for operating a rotary dough molding machine.

2. State of the Art

Rotary dough molding machines comprise a rotating die roller having on its surface a plurality of molds in the form of cavities (or recesses) for receiving dough. A feed roller (also called forcing roller) feeds dough coming from a hopper into the gap between die roller and feed roller and forces the dough into the molds of the die roller. In order to remove excess dough from the die roller a knife is provided for scraping the dough from the die roller's surface. The dough remaining in the molds is subsequently removed from the die roller usually by means of a belt, which runs in an abutting manner against the die roller.

According to prior art the knife adjustment in rotary molding machines has been done by an actuator arranged on one side of the machine. The motion of the actuator has then been transferred also to the opposite side of the machine by means of mechanical linkages which were also responsible for keeping the movements of the two ends of the knife synchronized. The adjustment of the linkage between both sides of the machine was done during factory assembly as a permanent setting not to be altered during the operation of the machine. However, when operating rotary molders product weight differences from side to side are observed and are mostly due to suboptimal alignment of the main components of the machine, i.e. die roller, feed roller or the knife. A further disadvantage can be seen in a plurality of transmission components and guide structures for transferring the motion of the actuator also to the other side of the machine, requiring a complicated design and resulting in high costs. Moreover, the mechanical linkages extend in the same space, where dough is fed by the rollers, making it difficult to comply with hygiene specifications. With time the components become contaminated with dough and have to be serviced or exchanged.

SUMMARY

Accordingly, it is an object of the invention to provide an improved rotary dough molding device. In particular, the rotary dough molding device shall allow for optimal adjustment of the knife relative to the die roller and also comply with hygienic specifications. The construction shall be simple and space saving.

The problem of the invention is solved by a rotary dough molding machine as defined in the opening paragraph, in that the driving means comprises a first drive acting on the first end of the knife and a second drive acting on the second end of the knife, wherein the first drive and the second drive can be actuated independently of each other. Thus, the first end of the knife and the second end of the knife are adjustable independent from each other.

The first drive acts on the first end of the knife causing a movement of the knife's first end along a first line of movement, and the second drive acts on the second end of the knife causing a movement of the knife's second end along a second line of movement, wherein the first line of movement and the second line of movement are essentially parallel to each other. It is preferred that the first line of movement and the second line of movement are defined by parallel guides.

With the invention an optimal alignment of the knife relative to the die roller may be achieved. The possibility of independently actuating the drives allows for a uniform alignment of the knife along the entire length of die roller. Tolerances or suboptimal alignment of other components of the machine, particularly the die roller, may be compensated reliably and at any stage of operation. Moreover, mechanical linkages extending from one side to the other side of the machine are not needed any more, guaranteeing a high hygienic standard.

The die roller has on its surface a plurality of molds in the form of cavities (or recesses) for receiving dough. The knife is used to remove (scrape) excess dough from the die roller's surface. The dough remaining in the molds is subsequently removed from the die roller usually by means of a belt. The rotary dough molding machine is used for making bakery products, such as biscuits, cookies, crackers, etc. After being shaped by means of the rotary dough molding machine the (intermediate) products are brought into a baking oven for baking.

The knife extends between its first end and its second end along the die roller. The edge of the knife extends essentially parallel to the die roller. In the scraping position the knife may abut against the die roller and in the inactive (non-scraping) position the knife is distanced from the die roller. From this inactive position the knife may be removed from the machine for e.g. cleaning or servicing purposes.

Each drive may directly or indirectly (e.g. via a transmission element, a coupling or a support) act on the respective end of the knife.

The first drive and the second drive each comprise an actuator, preferably a motor or a cylinder. The actuator of the first drive and the actuator of the second drive can be actuated (particularly energized) independently from each other. The actuator may be energized preferably by electric, magnetic, pneumatic and/or hydraulic energy. The drives may transmit a linear movement, a rotational movement and/or combinations thereof. A preferred embodiment is a spindle drive.

It is preferred that the rotary dough molding machine comprises a feed roller rotatably mounted to the frame, wherein the rotational axes of the die roller and the feed roller are essentially parallel to each other, and wherein in the scraping position the knife extends into the gap between the die roller and the feed roller. The feed roller (also called forcing roller) feeds dough into the gap between die roller and feed roller and forces the dough into the molds formed in the surface of the die roller. Although other feeding or forcing means (forcing belt, stationary wall, etc.) for pressing dough into the molds of the die roller would be possible, a feed roller is very advantageous yielding optimal results relating to the shape of the products. Usually, a hopper (for facilitating dough input) is provided above the gap formed between the die roller and the feed roller.

In a preferred embodiment the rotary dough molding machine comprises a control device that is in communication with the first drive and the second drive, wherein the drives can be actuated by the control device automatically and/or in dependence of commands generated by means of a human interface (e.g. touch screen, mouse, console). This allows for a precise and reliable adjustment of the knife also during operation of the machine. Deviations of an optimal alignment can be corrected immediately In a preferred embodiment the rotary dough molding machine comprises
- a first sensor detecting movement and/or position of the first end of the knife and/or load acting on the first end of the knife, and
- a second sensor detecting movement and/or position of the second end of the knife and/or load acting on the second end of the knife. The ends of the knife may be monitored independently from each other by (independent) sensors. Particularly, deviations of an optimal alignment of the knife may be reliably detected. The sensor may be e.g. a (linear) encoder, such as a motion encoder, or a contact-free sensor. The value measured by the sensor may be a direct or indirect measure of knife's end movement, position or load. The (first and second) sensors may be encoders (linear or angle encoders), pressure and/or force sensors (e.g. comprising at least one piezoelectric element or a strain gauge), touch-less sensors (e.g. optical or capacitive or inductive sensor), etc.

In a preferred embodiment the first sensor and the second sensor are in communication with the control device, wherein the control device is capable of controlling the drives in dependence of values measured by the sensors and/or of displaying on a human interface (e.g. screen) values obtained by the sensors. Misalignments between knife and die roller are prevented at any stage of operation. A high and reliable quality of the resulting products may be achieved.

In a preferred embodiment
- the knife extends between a first frame portion and a second frame portion, and wherein
- the first end of the knife is supported by a first support, that is movably mounted to the first frame portion and coupled to the first drive, and
- the second end of the knife is supported by a second support, that is movably mounted to the second frame portion and coupled to the second drive. Here, the support acts as coupling element between each drive and the respective end of the knife. Each support is held by the respective frame portion. The first and second frame portions are portions of the frame that also supports the die roller (and—if applicable—the feed roller).

In a preferred embodiment the first support extends through the first frame portion and the second support extends through the second frame portion. In this embodiment only the support extends into the space between the first and second frame portion. Arrangement of other parts relating to knife adjustment can be avoided within that (inner) space.

In a preferred embodiment each sensor is connected on the one hand with the support and on the other hand with the frame portion. Here, the relative motion/position between support and frame portion is a direct measure of the motion/position of the knife. As already mentioned the sensor may be provided in form of a (linear) encoder.

In a preferred embodiment the first drive is spatially separated from the knife by the first frame portion and the second drive is spatially separated from the knife by the second frame portion. Here, the drives are arranged on the outside of the frame portions, while the knife extends inside the frame portions. The hygienic standard is increased since the drives are (completely) separated from the inner frame space that during operation also contains dough. Service and exchange of the drives are also facilitated by this embodiment.

In a preferred embodiment each support has an inner portion facing towards the knife and an outer portion spatially separated from the knife by the respective frame portion, wherein the inner portion and the outer portion are detachable from each other, preferably by releasing at least one screw.

In a preferred embodiment the knife loosely rests on the first support and on the second support, preferably on a form-fitting structure. Cleaning and exchange of the knife becomes much easier. The form-fitting structure may be e.g. a recess in the support.

In a preferred embodiment the first frame portion forms a first guide, preferably a slotted guide, in which the first support is slidably mounted and the second frame portion forms a second guide, preferably a slotted guide, in which the second support is slidably mounted, wherein preferably the guides have an arc-shaped run. Here, the frame can be used as guide for the support.

In a preferred embodiment each support communicates with the respective guide via at least one sliding disc, preferably made of plastic, inserted between support and guide, preferably in a recess formed in the support or in the guide. Usually frame and support are made of (stainless) steel. A sliding disc of other material than steel may reduce friction during adjustment of the knife.

In a preferred embodiment the first drive and the second drive are linear drives, wherein preferably the first drive is pivotably mounted to the first frame portion and pivotably mounted to the first support and/or the second drive is pivotably mounted to the second frame portion and pivotably mounted to the second support. Linear drives that are only fixed by (two) screws (one screw in each pivoting point) can be easily detached e.g. for service.

In a preferred embodiment the knife is continuously adjustable by the drives between the first position and the second position. Precise knife adjustment becomes possible.

In a preferred embodiment the knife is formed by a base and blade mounted to the base, wherein preferably the base has end portions extending beyond the blade and each drive acts on the respective end portion of the base.

The problem is also solved by a method for operating a rotary dough molding machine comprising adjustment of the knife relative to the die roller, wherein the first end of the knife and the second end of the knife are adjusted independently from each other. It is noted at this point that the embodiments of the rotary dough molding machine and the associated advantages presented herein equally relate to the method.

The invention further allows electronic calibration of knife's adjustment by means of the machine's human-machine interface (HMI). Imbalances in knife position detected during production can be corrected by the user also on the HMI by simple settings. The independent sensors (e.g. motion encoders) in both sides also make the detection of alignment errors possible and let the machine control system decide how to respond. The removal of mechanical linkages, bearings and gear segments from the product zone (between the frame portions) represents a significant advantage in relation to the sanitary design of the machine. Preferably, only the inner portion of the support is inside the product zone. All the rest is outside the machine frame/chassis.

BRIEF DESCRIPTION OF THE DRAWINGS

For a better understanding of the invention the latter is explained in more detail with reference to the following Figures. In a simplified, schematic representation:

FIG. 3 shows an embodiment of drive, sensor and knife support;

FIG. 4 shows the communication between drives, sensors and control device;

FIG. 5 shows the knife and the driving means (without frame); and

DETAILED DESCRIPTION

Generally, the same parts or similar parts are denoted with the same/similar names and reference signs. The features disclosed in the description apply to parts with the same/similar names respectively reference signs. Indicating the orientation and relative position (up, down, sideward, etc.) is related to the associated Figure, and indication of the orientation and/or relative position has to be amended in different Figures accordingly as the case may be.

Figure 1:
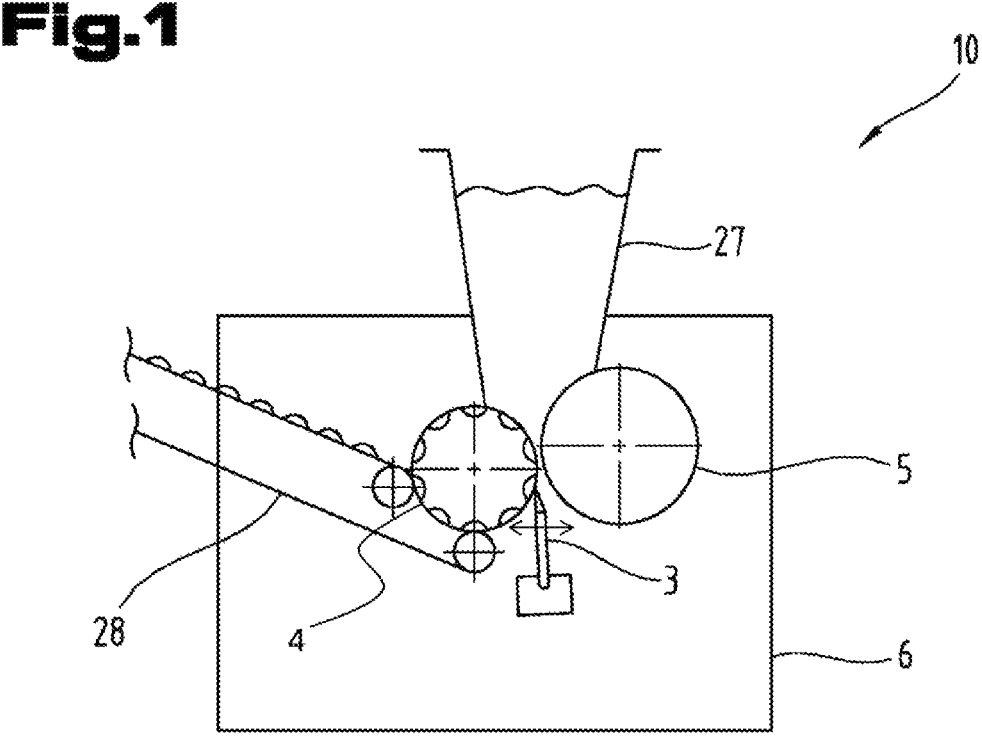
FIG. 1 shows in a schematic illustration a rotary dough molding machine.

FIG. 1 shows a rotary dough molding machine 10 comprising a frame 6, a die roller 4 and a feed roller 5, both rotatably mounted within the frame 6 about parallel axes of rotation, and a knife 3 for scraping dough from the die roller 4. A plurality of molds (in form of cavities for receiving dough) is formed in the surface of the die roller 4. The knife 3 extends between its ends 31, 32 along the die roller 4 (FIG. 2) and scrapes excess dough from the surface of the die roller 4. FIG. 1 shows the scraping position of the knife 3 that extends into the gap between the die roller 4 and the feed roller 5. In the inactive position the knife 3 will be distanced from the die roller 4. Movement between scraping position and inactive position is indicated by the double arrow in FIG. 1.

A hopper 27 is provided for supplying dough to the rollers 4, 5 and a (rubber) belt 28 is provided for receiving the molded dough pieces from the molds formed in the surface of the die roller 4.

Figure 2:
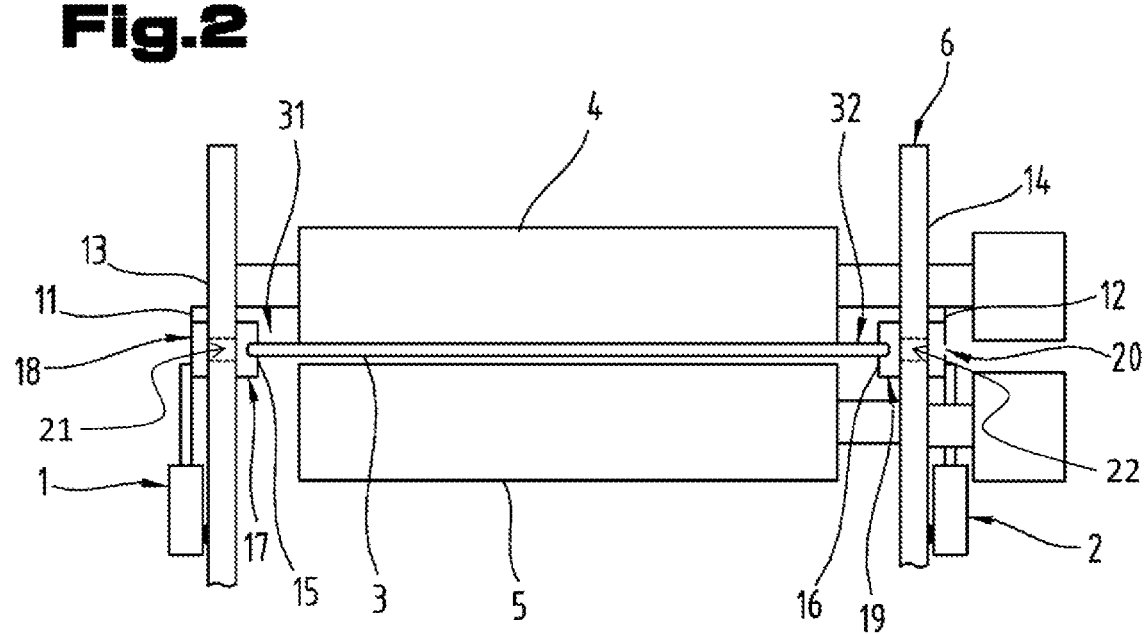
FIG. 2 shows in a top view a rotary dough molding machine.

FIG. 2 shows driving means for moving the knife 3 between a scraping position, in which the knife 3 abuts (or nearly abuts) with its edge against the die roller 4, and an inactive position, in which the knife 3 is distanced from the die roller 4. The driving means comprises a first drive 1 acting on the first end 31 of the knife 3 and a second drive 2 acting on the second end 32 of the knife 3. The first drive 1 and the second drive 2 can be actuated independently of each other. The first drive 1 and the second drive 2 each comprise an actuator, preferably a motor or a cylinder. In a preferred embodiment the drives 1, 2 are spindle drives.

The first drive 1 acts on the first end 31 of the knife 3 causing a movement of the knife's first end 31 along a first line of movement, and the second drive 2 acts on the second end 32 of the knife 3 causing a movement of the knife's second end 32 along a second line of movement, wherein the first line of movement and the second line of movement are essentially parallel to each other. As will be described below the (first and second) line of movements are preferably defined by parallel guides 21, 22.

It is preferred that the knife 3 is continuously adjustable by the drives 1, 2 between the scraping position and the inactive position. During the adjustment procedure of knife 3 relative to the die roller 4 the first end 31 of the knife 3 and the second end 32 of the knife 3 may be adjusted independently from each other and at any stage of operation.

As can be seen from the preferred embodiment of FIG. 4 the rotary dough molding machine 10 may comprise a control device 9 that is in communication with the first drive 1 and the second drive 2, wherein the drives 1, 2 can be actuated by the control device 9 automatically and/or in dependence of commands generated by means of a human interface 8.

From the embodiments shown in FIGS. 2-6 it can be seen that the rotary dough molding machine 10 may comprise a first sensor 11 detecting movement and/or position of the first end 31 of the knife 3 and/or load acting on the first end 31 of the knife 3, and a second sensor 12 detecting movement and/or position of the second end 32 of the knife 3 and/or load acting on the second end 32 of the knife 3.

FIG. 4 shows that the first sensor 11 and the second sensor 12 may be in communication with the control device 9, wherein the control device 9 is capable of controlling the drives 1, 2 in dependence of values measured by the sensors 11, 12 and/or of displaying on a human interface 8 values obtained by the sensors 11, 12.

In the preferred embodiment of FIG. 2 the knife 3 extends between a first frame portion 13 and a second frame portion 14. The frame portions 13, 14 belong to the same frame that rotatably supports rollers 4, 5. The first end 31 of the knife 3 is supported by a first support 15, which is movably mounted to the first frame portion 13 and coupled to the first drive 1. The second end 32 of the knife 3 is supported by a second support 16, which is movably mounted to the second frame portion 14 and coupled to the second drive 2. Here, the first support 15 extends through the first frame portion 13 and the second support 16 extends through the second frame portion 14 (indicated by the dashed lines).

Each support 15, 16 may have an inner portion 17, 19 facing towards the knife 3 and an outer portion 18, 20 spatially separated from the knife 3 by the respective frame portion 13, 14, wherein the inner portion 17, 19 and the outer portion 18, 20 are detachable from each other, preferably by releasing at least one screw (not shown). Each drive 1, 2 is coupled to the outer portion 18, 20 of the respective support 15, 16. As can be seen from FIG. 2 the first drive 1 is spatially separated from the knife 3 by the first frame portion 13 and the second drive 2 is spatially separated from the knife 3 by the second frame portion 14. With other words: the drives 1, 2 are arranged outside the space between frame portions 13, 14.

It is preferred that the knife 3 loosely (i.e. detachably without fastening means) rests on the first support 15 and on the second support 16, preferably on a form-fitting structure. The form fitting structure may be e.g. a recess in the supports.

In order to define the movement path of the knife the first frame portion 13 forms a first guide 21 (here: a slotted guide), in which the first support 15 is slidably mounted. The second frame portion 14 forms a second guide 22 (here: a slotted guide), in which the second support 16 is slidably mounted. The guide 21, 22 may have an arc-shaped run in order to optimally bringing up the knife 3 towards the die roller 4.

Figure 6:
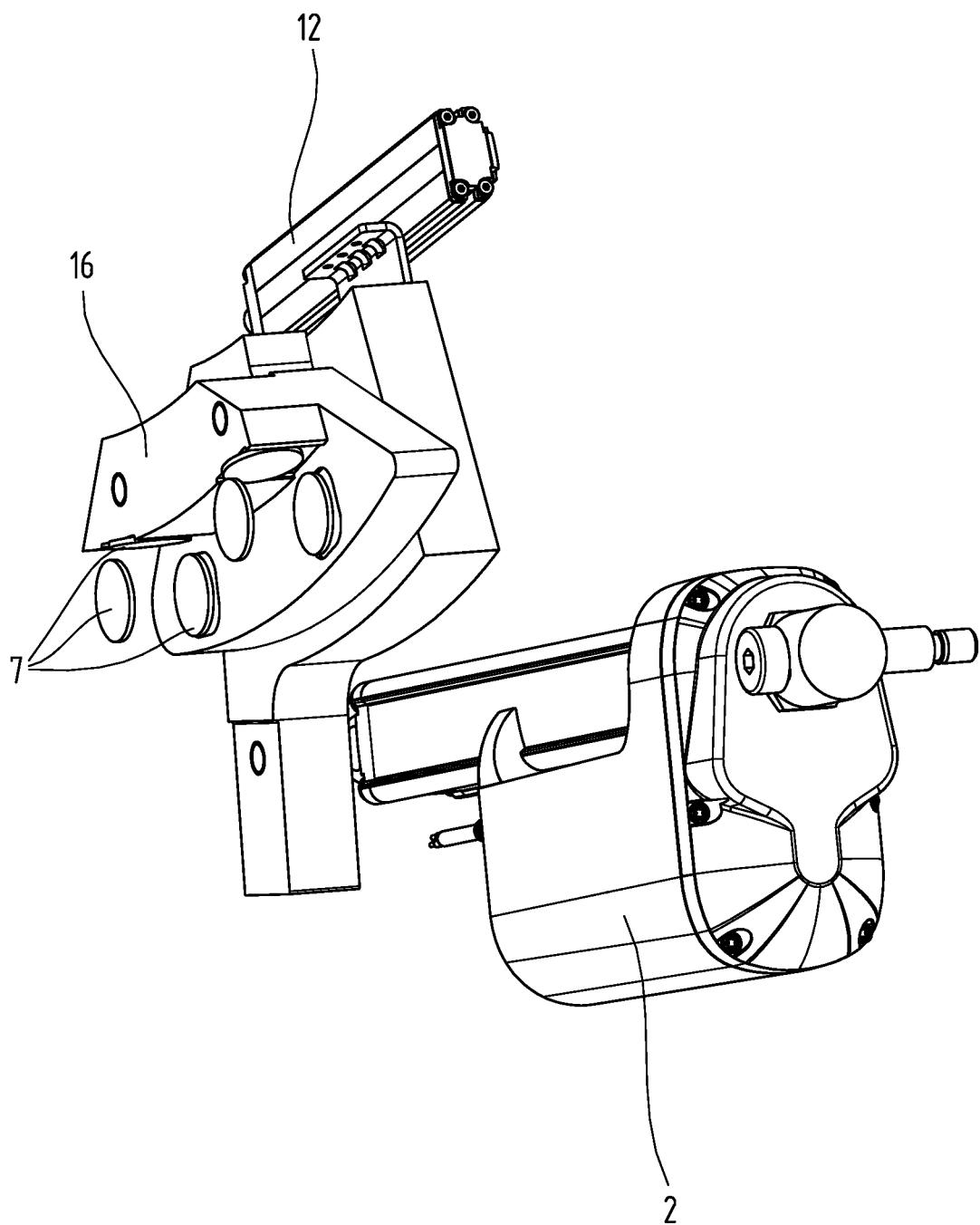
FIG. 6 shows in detail an embodiment of drive, sensor and knife support.

Each support 15, 16 may communicate with the respective guide 21, 22 via at least one (here: several) sliding disc 7, preferably made of plastic, inserted between support 15, 16 and guide 21, 22 (FIG. 6). Recesses may be formed in the support 15, 16 or in the guide 21, 22 for receiving the sliding disc(s).

In the embodiment shown the drives 1, 2 are linear drives. The first drive 1 is pivotably mounted to the first frame portion 13 and pivotably mounted to the first support 15. The second drive 2 is pivotably mounted to the second frame portion 14 and pivotably mounted to the second support 16.

From FIG. 5 it can be seen, that the knife 3 is formed by a base 24 and blade 23 mounted to the base 24. In the embodiment shown, the base 24 has end portions 25, 26 extending beyond the blade 23. Each drive 1, 2 acts on the respective end portion 25, 26 of the base 24.

It is noted that the invention is not limited to the embodiments disclosed hereinbefore, but combinations of the different variants are possible. For example rotary drives may be used (instead of linear drives) as well. The coupling between each drive and corresponding knife end may be different and comprise other transmission elements as in the embodiments shown. It would be also possible that the drives directly act on the respective ends of the knife. The drives may be alternatively arranged on the inner side of the frame portions. The movement of the knife from the scraping position to the inactive position may follow an arc-shaped run, a linear run or any other run and/or may comprise a rotational component. Alternatively to a slotted guide within the frame also a guide structure attached to the frame would be possible. Any mounting allowing a movement of the knife between the scraping position and the inactive position would be possible. The (first and second) sensors may be encoders (linear or angle encoders), pressure and/or force sensors (e.g. comprising at least one piezoelectric element or a strain gauge), touch-less sensors (e.g. optical or capacitive or inductive sensor), etc. In reality, the rotary dough molding machine may have more or less parts than shown in the Figures. The machine and parts thereof may also be shown in different scales and may be bigger or smaller than depicted. Finally, the description may comprise subject matter of further independent inventions.

LIST OF REFERENCE SIGNS 1 first drive
2 second drive
3 knife
4 die roller
5 feed roller
6 frame
7 sliding disc
8 human interface
9 control device
10 rotary dough molding machine
11 first sensor
12 second sensor
13 first frame portion
14 second frame portion
15 first support
16 second support
17 inner portion of first support 15
18 outer portion of first support 15
19 inner portion of second support 16
20 outer portion of second support 16
21 first guide
22 second guide
23 blade
24 base
25 end portion of base 24
26 end portion of base 24
27 hopper
28 belt
31 first end of knife 3
32 second end of knife

The invention claimed is:

1. Rotary dough molding machine, comprising:
a frame;
a die roller rotatably mounted to the frame;
a knife configured to scrape dough from the die roller, said knife extending along the die roller;
a driver configured to move the knife between a scraping position and an inactive position, the driver comprising a first drive acting on a first end of the knife and a second drive acting on a second end of the knife, wherein the first drive and the second drive are configured to control position of the knife relative to the die roller;
a first sensor configured to detect loading acting on the first end of the knife;
a second sensor configured to detect loading acting on the second of the knife; and
a control device that is in communication with the first drive and the second drive, wherein the first and second drives are configured to be actuated independently with respect to one another by the control device automatically or in dependence of commands generated by means of a human interface;
wherein the first sensor and the second sensor are in communication with the control device, wherein the control device is configured to control the first and second drives and control position of the knife relative to the die roller in dependence of values measured by the first and second sensors.

2. Rotary dough molding machine according to claim 1, wherein:
the control device is configured to control the first and second drives in dependence of displaying on a human interface values obtained by the first and second sensors.

3. Rotary dough molding machine according to claim 1, wherein:
the knife extends between a first frame portion and a second frame portion,
the first end of the knife is supported by a first support, that is movably mounted to the first frame portion and coupled to the first drive,
the second end of the knife is supported by a second support, that is movably mounted to the second frame portion and coupled to the second drive, and
the first support extends through the first frame portion and the second support extends through the second frame portion.

4. Rotary dough molding machine according to claim 3, wherein:
the first drive is spatially separated from the knife by the first frame portion and the second drive is spatially separated from the knife by the second frame portion.

5. Rotary dough molding machine according to claim 3, wherein:
each one of the first and second supports has an inner portion facing towards the knife and an outer portion spatially separated from the knife by the corresponding one of the first and second frame portions, wherein the inner portion and the outer portion are detachable from each other by releasing at least one screw.

6. Rotary dough molding machine according to claim 3, wherein:
the knife loosely rests on the first support and on the second support, on a form-fitting structure.

7. Rotary dough molding machine according to claim 3, wherein:
the first frame portion forms a first guide, in which the first support is slidably mounted and the second frame portion forms a second guide, in which the second support is slidably mounted.

8. Rotary dough molding machine according to claim 7, wherein:
each one of the first and second supports communicates with the corresponding one of the first and second guides via at least one sliding disc made of plastic that is disposed in a recess formed in the one of the first and second supports or in the corresponding one of the first and second guides.

9. Rotary dough molding machine according to claim 7, wherein:
the first and second guides comprise arc-shaped slotted guides.

10. Rotary dough molding machine according to claim 3, wherein:
the first drive and the second drive are linear drives, where the first drive is pivotably mounted to the first frame portion and pivotably mounted to the first support and/or the second drive is pivotably mounted to the second frame portion and pivotably mounted to the second support.

11. Rotary dough molding machine according to claim 1, wherein:
the knife is continuously adjustable by the first and second drives between the scraping position and the inactive position.

12. Rotary dough molding machine according to claim 1, wherein:
the knife is formed by a base and blade mounted to the base.

13. Rotary dough molding machine according to claim 12 wherein:
the base has end portions extending beyond the blade and each one of the first and second drives acts on a corresponding end portion of the base.

14. Rotary dough molding machine according to claim 1, further comprising:
a feed roller rotatably mounted to the frame, wherein the rotational axes of the die roller and the feed roller are parallel to each other, and wherein in the scraping position the knife extends into the gap between the die roller and the feed roller.

15. Method for dough molding, comprising:
providing a rotary dough molding machine including
a frame,
a die roller rotatably mounted to the frame,
a knife configured to scrape dough from the die roller, said knife extending along the die roller; and a driver configured to move the knife between a scraping position and an inactive position, the driver comprising a first drive acting on the first end of the knife and a second drive acting on the second end of the knife, wherein the first drive and the second drive are configured to control position of the knife relative to the die roller,
a first sensor configured to detect loading acting on the first end of the knife,
a second sensor configured to detect loading acting on the second of the knife, and
a control device that is in communication with the first drive, the second drive, the first sensor, and the second sensor, wherein the first and second drives are configured to be actuated independently with respect to one another by the control device automatically or in dependence of commands generated by means of a human interface; and
operating the control device to adjust position of the knife relative to the die roller, wherein position of the first end of the knife and position of the second end of the knife are adjusted independently with respect to one another in dependence of values measured by the first and second sensors.

* * * * *